Oct. 20, 1925.
A. BEETOW
BACKLASH TAKE-UP FOR GEARS
Filed Jan. 14, 1924
1,558,222
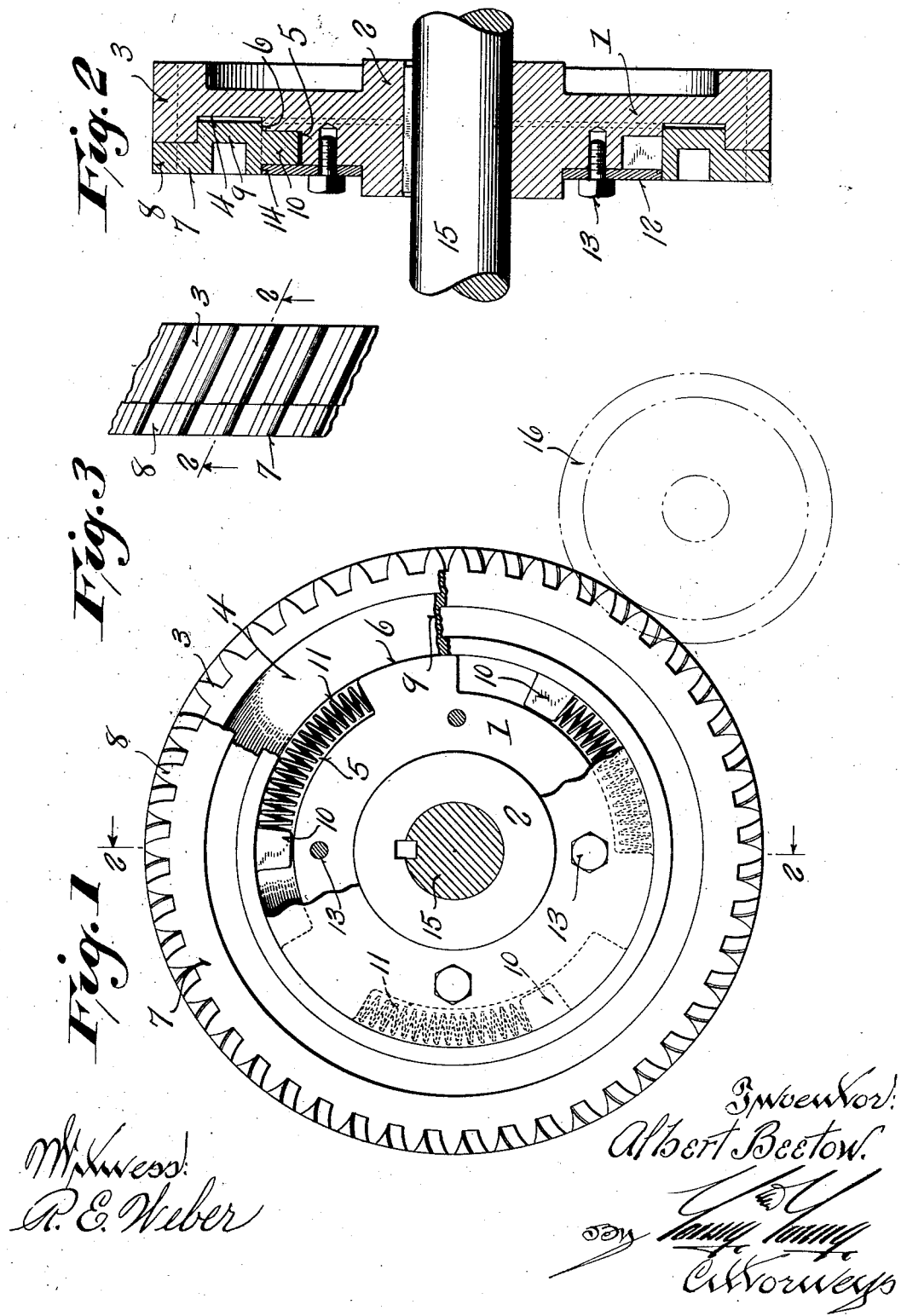

Patented Oct. 20, 1925.

1,558,222

UNITED STATES PATENT OFFICE.

ALBERT BEETOW, OF MILWAUKEE, WISCONSIN.

BACKLASH TAKE-UP FOR GEARS.

Application filed January 14, 1924. Serial No. 686,090.

*To all whom it may concern:*

Be it known that I, ALBERT BEETOW, a citizen of the United States, and resident of Milwaukee, in the county of Milwaukee and State of Wisconsin, have invented certain new and useful Improvements in Backlash Take-Ups for Gears; and I do hereby declare that the following is a full, clear, and exact description thereof.

This invention relates to an improved type of gear, and is particularly directed to a backlash takeup for gears.

Objects of this invention are to provide a gear which may be used in the ordinary capacity, and may be readily keyed to a shaft but which is equipped with means for taking up the backlash even when the gear has been run for a considerable length of time and material wear has occurred.

Further objects are to provide a very simple and inexpensive construction in which a minimum number of parts are employed to accomplish the taking up of backlash, in which the parts may be most readily made by ordinary machine shop processes, and in which no complicated or elaborate construction or additional parts are needed,—in other words to provide a gear which may be handled, operated, mounted upon the shaft and otherwise used in the usual capacity although equipped with a takeup for backlash.

An embodiment of the invention is shown in the accompanying drawings, in which:—

Figure 1 is a face view of the gear with parts broken away.

Figure 2 is a sectional view on the lines 2—2 of Figure 1 and 2—2 of Figure 3.

Figure 3 is a fragmentary view looking directly down upon a portion of the gear.

The gear comprises a main body portion 1 equipped with the usual hub 2 and with gear teeth 3. This body portion is turned out to provide an annular groove 4 of uniform depth and width completely around the gear. It is further provided with annular cut out or recessed portions 5 immediately inwardly of the annular groove 4 and opening thereinto, as shown in Figures 1 and 2 of the drawings. The annular grooves 5 or annular cutouts do not communicate with each other, as may be seen from Figure 1, but are formed as distinct portions of the gear, and are arranged in a regular order. It is to be noted from Figure 2 that the annular cutouts 5 do not extend inwardly of the body portion to as great an extent as the grooves 4 and that thus a shoulder 6 is provided, as may be seen from Figures 1 and 2.

An auxiliary gear or ring 7 is provided and is equipped with a plurality of teeth 8 which correspond in pitch and contour to the teeth 3 of the main gear. The gear 7 is provided with an annular protuberance 9 which slidably fits the annular groove 4, as may be seen from Figures 1 and 2. It is further provided with a plurality of regularly spaced integrally formed inwardly projecting tongues 10 which extend inwardly of the annular recesses 5.

A compression spring 11 is located in each annular cutout 5 and bears at one end against the end of its corresponding cutout and at the other end against the corresponding lug or projection 10 of the auxiliary gear 7.

A retaining ring 12 is held in position by means of a plurality of bolts 13 extending through such ring and extending into the body portion 1 of the main gear. This ring closes the annular cutouts 5 and surrounds the hub 2 of the main gear. Its outer marginal portion contacts with a shouldered portion 14 of the auxiliary gear 7 and such ring is inset so as to be flush with the outer surface of such auxiliary gear.

It is to be noted that the gear may be handled as an entity with the same facility as an ordinary gear, and may be keyed or otherwise secured to a shaft 15 in the usual manner.

It will be seen that springs 11 urge the teeth 8 towards the back of the teeth of the intermeshing gear, as indicated in dotted lines at 16 in Figure 1, and take up all of the backlash. It is obvious that the exact pressure desired could be most readily secured by varying the extent of compression of the springs 11. For example, this could be regulated by the extent to which the auxiliary gear 7 is moved backwardly with reference to the main gear 1 prior to meshing with the cooperating gear 16.

It will be seen that an extremely simple type of anti-backlash gear has been provided which consists substantially of three main portions, that is to say, the main gear 1, the auxiliary gear 7, and the retaining ring 12, exclusive, of course, of the springs and bolts. These three main parts may be most readily made by simple machine shop processes without materially increasing the cost of production.

Although the invention has been described in considerable detail, it is to be understood that the invention may be variously embodied and is, therefore, to be limited only as claimed.

I claim:

A gear comprising a main body member provided with teeth, an auxiliary ring-like member provided with teeth, said members having interengaging annular members, said main member having a plurality of separate annular recesses, said auxiliary member having a plurality of inwardly directed radial lugs located within said separate recesses, a plurality of springs seated within said recesses and bearing against said lugs, said main member having a hub, and a retaining ring surrounding said hub closing said separate recesses and retaining said lugs within said recesses, said retaining ring being carried between shoulders formed on said main and auxiliary members.

In testimony that I claim the foregoing I have hereunto set my hand at Milwaukee, in the county of Milwaukee and State of Wisconsin.

ALBERT BEETOW.